(12) United States Patent
Doss et al.

(10) Patent No.: US 10,579,914 B2
(45) Date of Patent: Mar. 3, 2020

(54) SYSTEM AND METHOD FOR ENCODING AND DECODING ITEMIZED TRANSACTION DATA

(71) Applicants: Stephen S. Doss, El Dorado, CA (US); James J. Leftwich, Palo Alto, CA (US); Gordon L. Fuller, Redwood City, CA (US)

(72) Inventors: Stephen S. Doss, El Dorado, CA (US); James J. Leftwich, Palo Alto, CA (US); Gordon L. Fuller, Redwood City, CA (US)

( * ) Notice: Subject to any disclaimer, the term of this patent is extended or adjusted under 35 U.S.C. 154(b) by 174 days.

(21) Appl. No.: 15/094,878

(22) Filed: Apr. 8, 2016

(65) Prior Publication Data
US 2017/0293831 A1   Oct. 12, 2017

(51) Int. Cl.
*G06K 15/00*   (2006.01)
*G06K 19/06*   (2006.01)
*G06Q 20/20*   (2012.01)

(52) U.S. Cl.
CPC ..... *G06K 19/06037* (2013.01); *G06Q 20/202* (2013.01); *G06Q 20/209* (2013.01)

(58) Field of Classification Search
CPC .. G06Q 20/209; G06Q 30/0283; G06Q 10/10; G06Q 30/0633; G06Q 30/06;
(Continued)

(56) References Cited

U.S. PATENT DOCUMENTS

2010/0306080 A1* 12/2010 Trandal .............. G06Q 10/10
705/26.8

2014/0012412 A1* 1/2014 Khonalkar ............ G07F 11/002
700/237

(Continued)

*Primary Examiner* — Thien T Mai
(74) *Attorney, Agent, or Firm* — William J. Benman; Benman, Brown & Williams

(57) ABSTRACT

A system for translating receipt data output by a point of sale system of the present invention. The system includes a first electrical interface coupled to said point of sale system; an electronic encoder circuit coupled to said first interface, said encoder circuit being adapted to receive receipt and translate alpha-numeric receipt data into two-dimensional bar code data; and a second electrical interface between said encoder and an output device for displaying said two-dimensional bar code data on an electronic or physical medium. A digital embodiment includes an electronic circuit operationally coupled between the point of sale system and a device, such as a printer, adapted to output a purchase receipt. Memory fixed in a tangible medium is coupled to the electronic circuit and code is stored therein. When the software is executed by the system, the system captures and processes itemized receipt data and, optionally, other data and information from the point of sale system and outputs to a printer, or to an electronic display, an optical machine-readable symbol, or series of symbols, representative of and encoding the itemized receipt data and, optionally, additional data and information. In the illustrative embodiment, the code is a two-dimensional bar code, or series of codes. The code or codes may be encrypted and compressed. The code, or codes, are read, decoded, decrypted and decompressed by a scanner implemented on a second platform, independent from the platform on which the first system is mounted. This process yields accurate itemized receipt data that can be read and processed by a smart phone or similar device for displaying, being read audibly or printing subject to the user's preferences and device capabilities.

10 Claims, 8 Drawing Sheets

(58) Field of Classification Search
CPC ...... G06Q 20/202; G06Q 30/02; G06Q 20/20;
G06Q 30/04; G06Q 20/0453; G06Q
20/102; G06Q 20/02; G06Q 20/123;
G06Q 20/204; G06Q 20/322; G06Q
20/342; G06Q 30/0601; G06Q 30/0635;
G06K 19/07722; G06K 7/1413; G06K
17/0022; G06K 19/06037; G06K 7/1096;
G06K 19/07794; G06K 17/00; G06K
7/10693; G06K 19/07769; G06K 7/0008;
G06K 7/10554; G06K 19/07783; G06K
1/18; G06K 7/10346; G06K 19/02; G06K
19/07749; G06K 19/07758; G06K
19/07771; G06K 7/0004; G06K 7/10178;
G06K 7/10821; G06K 7/10881; G06K
19/04; G06K 19/0702; G06K 19/0723;
G06K 19/07345; G06K 19/07754; G06K
19/07756; G06K 19/07773; G06K
19/07779; G06K 19/07781; G06K 19/10;
G06K 7/10009; G06K 7/10316; G06K
7/10336; G06K 7/10386; G06K 7/10742;
H01Q 1/2225; H01Q 7/00; H01Q 1/2283;
H01Q 1/243; H01Q 1/38; H01Q 9/0407;
H01Q 13/10; H01Q 1/242; H01Q 1/273;
H01Q 1/40; H01Q 7/06; H01Q 9/0414;
H01Q 9/0428; H01Q 9/0457; H01Q 9/16;
H01Q 9/285; H01Q 9/30; H01Q 1/12;
H01Q 1/1271; H01Q 1/2216; H01Q
1/246; H01Q 1/44; H01Q 21/29; H01Q
9/40; A61F 2009/00846; A61F
2009/00855; A61F 9/008; A61F 9/009
See application file for complete search history.

(56) References Cited

U.S. PATENT DOCUMENTS

2016/0217509 A1* 7/2016 Eggleston, IV ... G06Q 30/0283
2016/0292656 A1* 10/2016 Herring ............. G06Q 20/3221

* cited by examiner

SYSTEM AND METHOD FOR ENCODING AND DECODING ITEMIZED TRANSACTION DATA

BACKGROUND OF THE INVENTION

Field of the Invention

The present invention relates to electrical and electronic circuits and systems. Moreover, the present invention relates to electrical and electronic circuits and systems for receiving signals, encoding signals and outputting signals.

Description of the Related Art

Everyday countless transactions are made with and by merchants, using credit cards, debit cards, cash or other means to complete the purchase. Customers making purchases are usually given itemized receipts, listing multiple items and details associated with a purchase.

Purchase transactions represent an opportunity to provide a connection from the purchaser, through the enabling merchant, to the individual original item and product vendors, manufacturers, producers, or providers whose items were part of a purchase transaction. This could enable a pathway to simpler or automatic product registration, access to product information including, but not limited to, operating manuals, ingredients and sources, replacement of consumables, customer feedback, and servicing.

However, in accordance with conventional teachings, for purchase transactions involving credit or debit cards, in the process of facilitating the transfer of funds from the buyer to the merchant or seller, often only the total amount of the purchase is included in the information sent to a buyer's credit or debit card company. Later, when the purchasing customer receives the statement from the credit or debit card company or bank, purchases are referenced only by the total purchase amount, with no itemization or details of the constituent items in the purchase. (Note: This "total purchase amount" is referred to in the art as "Level 1 Processing." Level 2 and Level 3 Processing exists and is designated for B2B transactions and isn't currently used for regular customer purchases. Level 2 Processing typically includes a tax indicator denoting the presence of a sales tax, an itemized sales tax amount (must be greater than $0.00), and a unique customer code. Level 3 Processing includes all of the information associated with a Level 2 purchase plus transaction summary details like order date, invoice number, and address verification. It will also require line item details like item descriptions, product code, item quantity, and unit cost. For additional reference, see: https://paymentpop.com/level-1-level-2-and-level-3-interchange/)

The failure of these credit card systems to provide access to a digital form of itemized receipt to regular non-large-business purchasers places a significant burden of time and effort on such purchasers, requiring subsequent re-entry and categorization all of the individual constituent items, their individual prices and taxes included in the purchase into their banking registers, accounting ledgers or tracking software. Not only does this represent unnecessary and extra work for consumers, but constitutes a significant and unacceptable accessibility barrier for vision-impaired people.

This inability to easily access and integrate purchase data into customer accounting ledgers has been partly addressed by banks and credit card issuers that make basic non-itemized transaction information accessible to consumers and purchasing entities, but which contains only the merchant identification, transaction date, and total amount. Access in such systems can be viewed or downloaded in various formats, suitable for usage in conjunction with accounting software and other bookkeeping systems.

Alternative methods of capturing itemized receipt data include scanning individual paper receipts into software with capabilities of reading and identifying individual items in a purchase transaction, and digitizing them for suitable integration into accounting software.

Some accounting software allows subscription functionality, allowing users to specify and automatically and periodically download this non-itemized level of purchase transaction information directly into the user's accounting or bookkeeping file. But these users still need to reference the printed itemized receipt in order to break the purchase down into the constituent items and properly categorize and track the taxed portions of individual items in cases where detailed tracking and business accounting is desired.

In terms of user experience and ergonomic issues, alternative methods involving a digital image capture or scan of a printed paper receipt presents accuracy challenges, due to the variance in size and condition of printed paper receipts. These challenges may be further complicated if the paper receipt has been folded previously, or if any portion of the whole receipt become damaged or otherwise obscured, thus preventing or degrading the ability to scan or otherwise photographically capture it.

Such a scanning procedure could, in cases of longer receipts, require multiple images to be combined or stitched together as the digital image of the entirety of the itemized receipt prior to performing digital optical character recognition (OCR) conversion. These steps constitute additional digital processing and complexity that can contribute to problems in obtaining the itemized receipt data secondhand by photographic or scanned imaging means.

Secondly, there is the crucial issue of necessary and standardized formatting of itemized receipt data and other optional receipt information. Even of full paper receipt scanning methods succeed in accurately capturing alphanumeric data, there is the challenge of reconstructing a useful standardized format for that said captured data. Given the variances in formatting of different printed paper receipts from different merchants, this presents a challenge in presenting all of the itemized receipt data a customer user encounters in a standardized and usable format, such as being readily convertible to a single format usable by financial accounting software.

Some solutions requiring full paper receipt scanning offer customers the option of mailing in their paper receipts in batches to be processed in a dedicated facility, with the obtained digital data being delivered back to the customer. This may solve problems in customers doing their own full receipt scanning and improve overall accuracy of obtaining itemized receipt information, but in such methods, the customer cannot immediately obtain itemized receipt data, but must wait for the mailing, processing and results cycle.

Some solutions provided by merchants involve giving purchasing customers access to full digital copies of their itemized receipts online, with the access being in the form of a unique transaction ID-enabled URL, which in some embodiments is presented in a scan-able 2D bar code. In such a system, the purchasing customer uses a smart phone or other app-enabled electronic device with camera technology capable of scanning or otherwise imaging the two dimensional bar code, decoding to the encoded URL, and navigating a browser to the online digital copy of the itemized transaction purchase. Furthermore, some solutions allow customers to register so that they can archive and have ongoing access to an organized set of their itemized purchase receipts.

The obstacles in this scheme are two-fold. First, this system requires that the merchant have a backend network system encoding each and every itemized purchase transaction, generate unique transaction IDs and associated digital itemized receipt URLs, and sending these records to an online server which itself must be supported and maintained, and as such are too expensive or complex to utilize. Secondly, customers must have internet connectivity in order to access the unique URLs where their digital copies of itemized purchase receipts are located.

Some solutions solve the need to deliver an electronic copy of an itemized purchase receipt directly to a purchaser at the point of sale, but these utilize Near Field Communication (NFC) technologies, which utilize Bluetooth LE (Low Energy) in order to allow devices held in close proximity to transfer or exchange data. In such a solution, the purchasing customer holds a device, such as a smart phone with NFC capability, up to some portion of the merchant's POS equipment and the POS transfers the customer's itemized purchase receipt directly onto the customer's device. One significant obstacle for this solution is the need for merchants to upgrade all of their POS terminals to have NFC capability, which carries significant, and in some cases prohibitive, costs. For additional reference on NFC technology see: http://www.cnet.com/how-to/how-nfc-works-and-mobile-payments/)

Hence, a need remains in the art for a system or method for accurately capturing, formatting and outputting itemized receipt data in a manner that is easily and immediately accessible to the consumer, as well as being cost-effective and comparatively simple for merchants to incorporate into their existing POS terminal software, without needing to upgrade much more expensive hardware.

SUMMARY OF THE INVENTION

The need in the art is addressed by the system for translating receipt data output by a point of sale system of the present invention. The system includes a first electrical interface coupled to said point of sale system; an electronic encoder circuit coupled to said first interface, said encoder circuit being adapted to receive receipt and translate alphanumeric receipt data into two-dimensional bar code data; and a second electrical interface between said encoder and an output device for displaying said two-dimensional bar code data on an electronic or physical medium.

In an alternative digital embodiment, the inventive system includes an electronic circuit operationally coupled between the point of sale system and a device, such as a printer, adapted to output a purchase receipt. Memory fixed in a tangible medium is coupled to the electronic circuit and code, i.e., software, is stored therein. When the software is executed by the system, the system captures and processes itemized receipt data and, optionally, other data and information from the point of sale system and outputs to a printer, or to an electronic display, an optical machine-readable symbol, or series of symbols, representative of and encoding the itemized receipt data and, optionally, additional data and information.

In the illustrative embodiment, the code is a two-dimensional bar code or series of the same. The code may be encrypted and compressed. The code or codes are read, decoded, decrypted and decompressed by a scanner implemented on a second platform, independent from the platform on which the first system is mounted. This process yields accurate itemized receipt data that can be read and processed by a smart phone or similar device for displaying, being read audibly or printing subject to the user's preferences and device capabilities.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
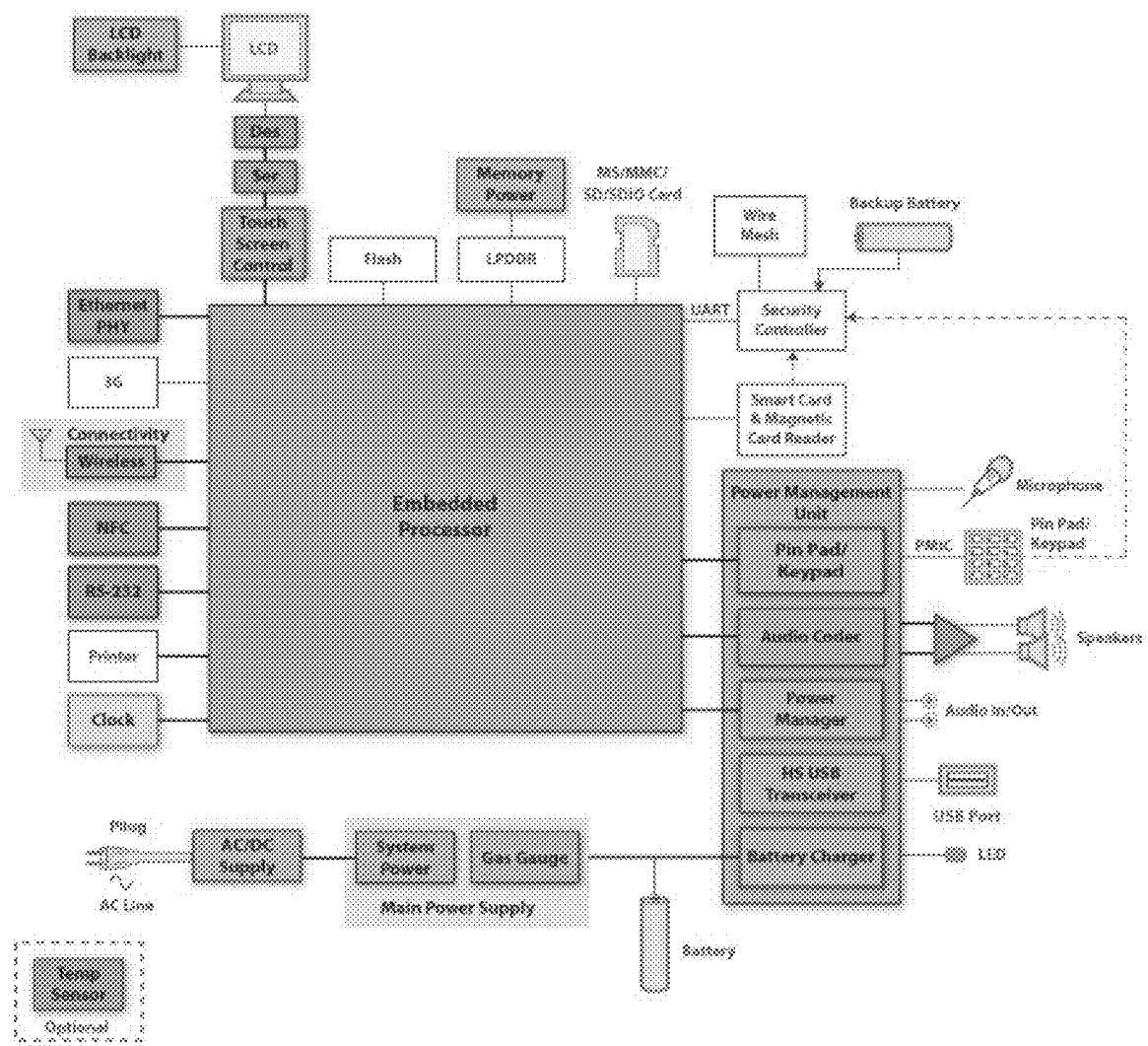
FIG. 1 is a block diagram of a conventional point of sale system implemented in accordance with conventional teachings.

FIG. 1 is a block diagram of a conventional point of sale system implemented in accordance with conventional teachings. As is common in the industry, a typical Point of Sale (PoS) system such as that depicted in FIG. 1 includes a bar code scanner, smart card reader, keypad, touch screen, display, processor, printer and numerous interfacing arrangements including wireless, Ethernet, RS-232, NFC, Bluetooth, WiFi and USB. Also included is a power supply and user I/O. These systems typically print a receipt for each transaction that lists the items purchased by the customer. As mentioned above, there is a need in the art for a system or method for importing itemized receipt data into a customer's platform for storage, display and/or processing with greater accuracy than conventional systems. This need is addressed by the system and method of the present invention.

Figure 2:
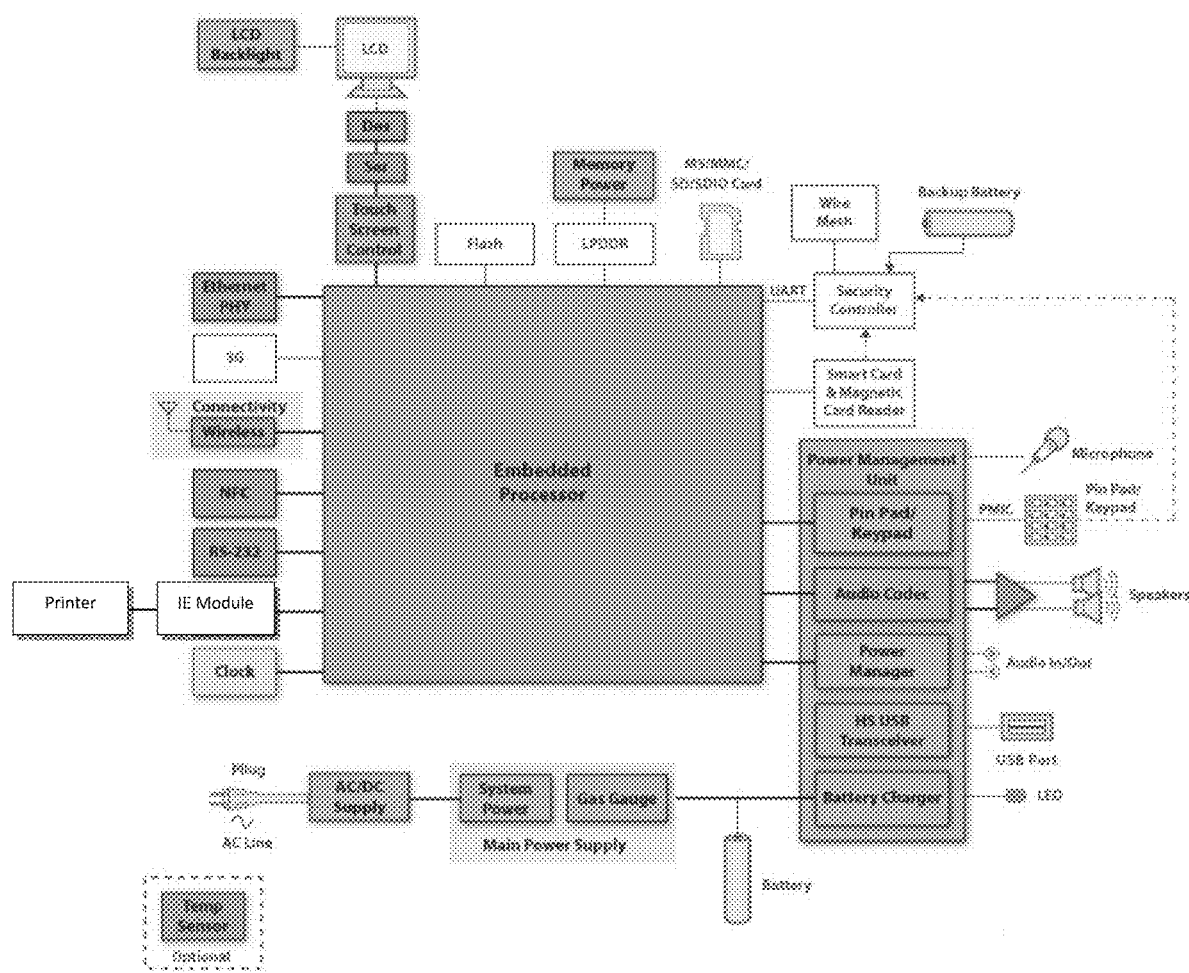
FIG. 2 is a block diagram of a point of sale system utilizing a hardware implementation of the system for processing point of sale transaction documentation of the present invention.

FIG. 2 is a block diagram of a point of sale system utilizing a hardware implementation of the system for processing point of sale transaction documentation of the present invention. In this embodiment, in accordance with the present teachings, an Item Eyes (IE) module or 'IEM' is inserted between a processor and a printer of the PoS system of FIG. 1. As discussed more fully below, the IE module receives itemized receipt data from the print spooler of the processor, extracts transaction data, adds any additional data per the user or the merchant's preferences, optionally encodes, encrypts and compresses the data and translates the data into a symbol, or series of symbols, that is printed, along with the original transaction data, on the receipt as a machine readable symbol. In the illustrative embodiment, the symbol is a two-dimensional bar code.

It should be noted that the embodiment depicted in FIG. 2 is for illustrative purposes only. The present teachings allow for a much more simple implementation by which PoS data is captured, encoded and accessed in a more accurate, efficient and low cost manner than would be possible with conventional systems.

Figure 3:
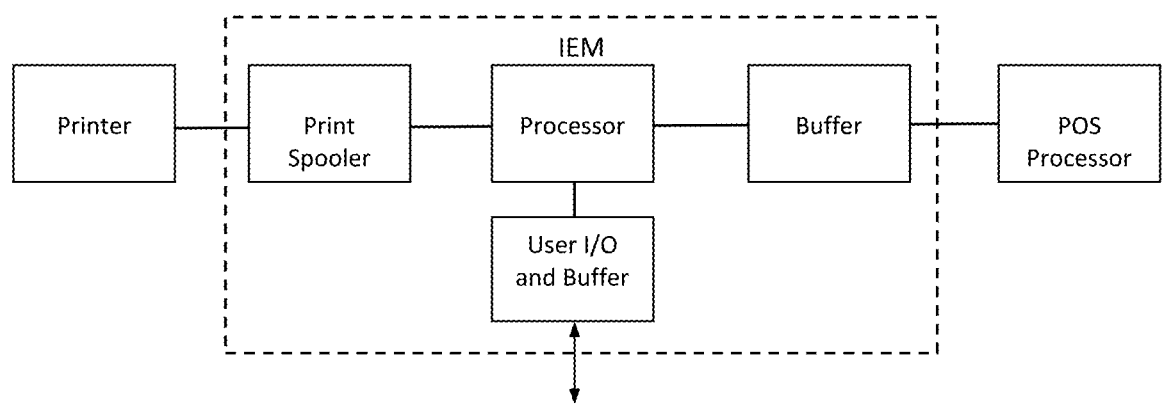
FIG. 3 is a block diagram of the illustrative hardware implementation of the system for processing point of sale transaction documentation depicted in FIG. 2.

FIG. 3 is a block diagram of the illustrative hardware implementation of the system for processing point of sale transaction documentation depicted in FIG. 2. As illustrated in FIG. 3, the IEM is operationally coupled, via wired or wireless connection, between a PoS processor and a printer and includes a buffer, a processor and a print spooler. The IEM can be powered by the processor or other means, e.g. battery, as is well-known in the art. The buffer takes in data conventionally intended for the printer and stores it for access by the IEM processor. The IEM processor optionally adds data from the user via the I/O buffer and subsequently encrypts, encodes and/or compresses the itemized data along with the user data into a symbol, or series of symbols, such as a 2D bar code, 3D bar code or other suitable machine readable symbol. This symbol or series of symbols are then sent to the printer via the print spooler to be printed on the media along with the original receipt or document data, and/or presented to the customer on an electronic display. The symbol is adapted to be read by a customer or user's device such as a scanner or smartphone.

Figure 4:
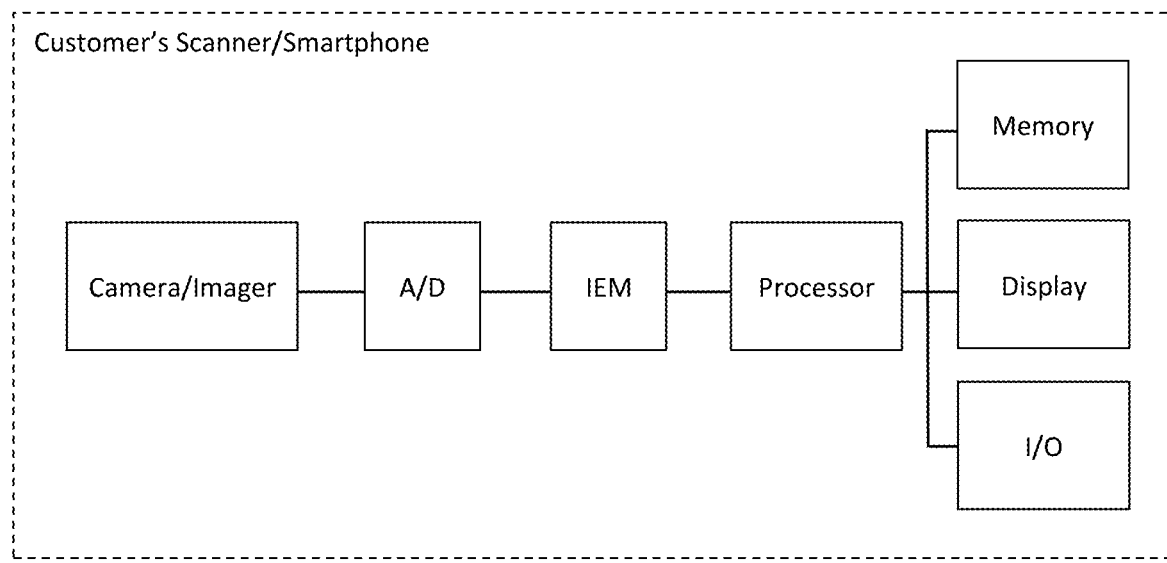
FIG. 4 is a block diagram of an illustrative implementation of a customer side scanner/smartphone platform adapted for use with the system for processing point of sale transaction documentation of the present invention.

FIG. 4 is a block diagram of an illustrative implementation of a customer side scanner/smartphone platform adapted for use with the system for processing point of sale transaction documentation of the present invention. As shown in FIG. 4, the customer's system includes a camera or scanner adapted to read the receipt or document output by the system depicted in FIG. 3. The output of the camera/scanner is digitized by the analog-to-digital converter and input to an onboard IEM module that serves to decrypt, decode and decompress the IEM symbol, or series of symbols, printed on the document. This data is presented to the user by the processor for filing, display and/or storage subject to the user's preferences in accordance with the present teachings as depicted in FIG. 5 and discuss more fully below.

Figure 5:
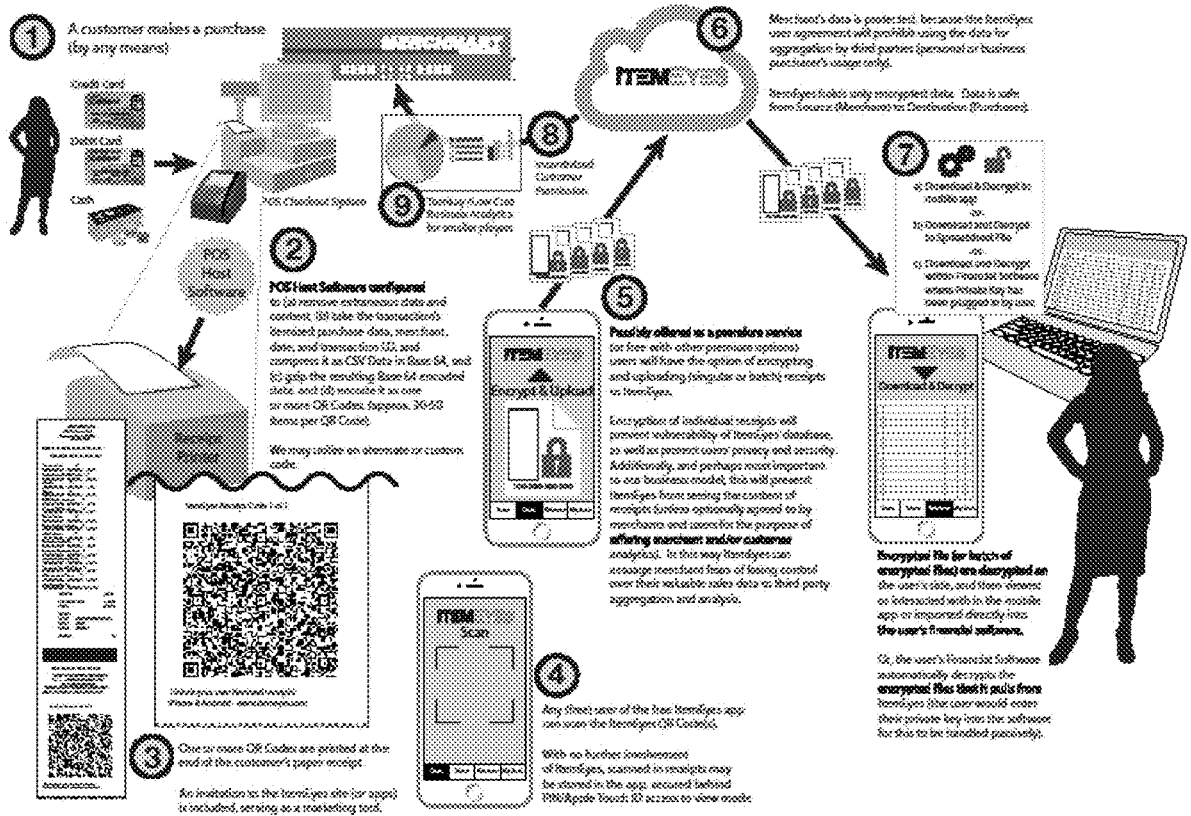
FIG. 5 is a diagram showing an illustrative implementation of the method of operation of the present invention.

FIG. 5 is a diagram showing an illustrative implementation of the method of operation of the present invention. In accordance with the inventive method, in an illustrative shopping implementation, at step 1, the customer makes a purchase by any means using a credit card, debit card, loyalty card or cash.

At step 2, a PoS system, configured in accordance with the present teachings, removes extraneous data and content, takes the transaction's itemized purchase data, merchant data, date, transaction I.D. and other data and encodes it as CSV data in base 64, or other suitable format, and compresses the encoded data using gzip or other suitable compression scheme prior to encoding into 2D bar code, or other suitable format.

At step 3, the encoded symbol (in the illustrative embodiment: 2D bar code) is printed at the end of the receipt along with the original itemized data.

Figure 6:
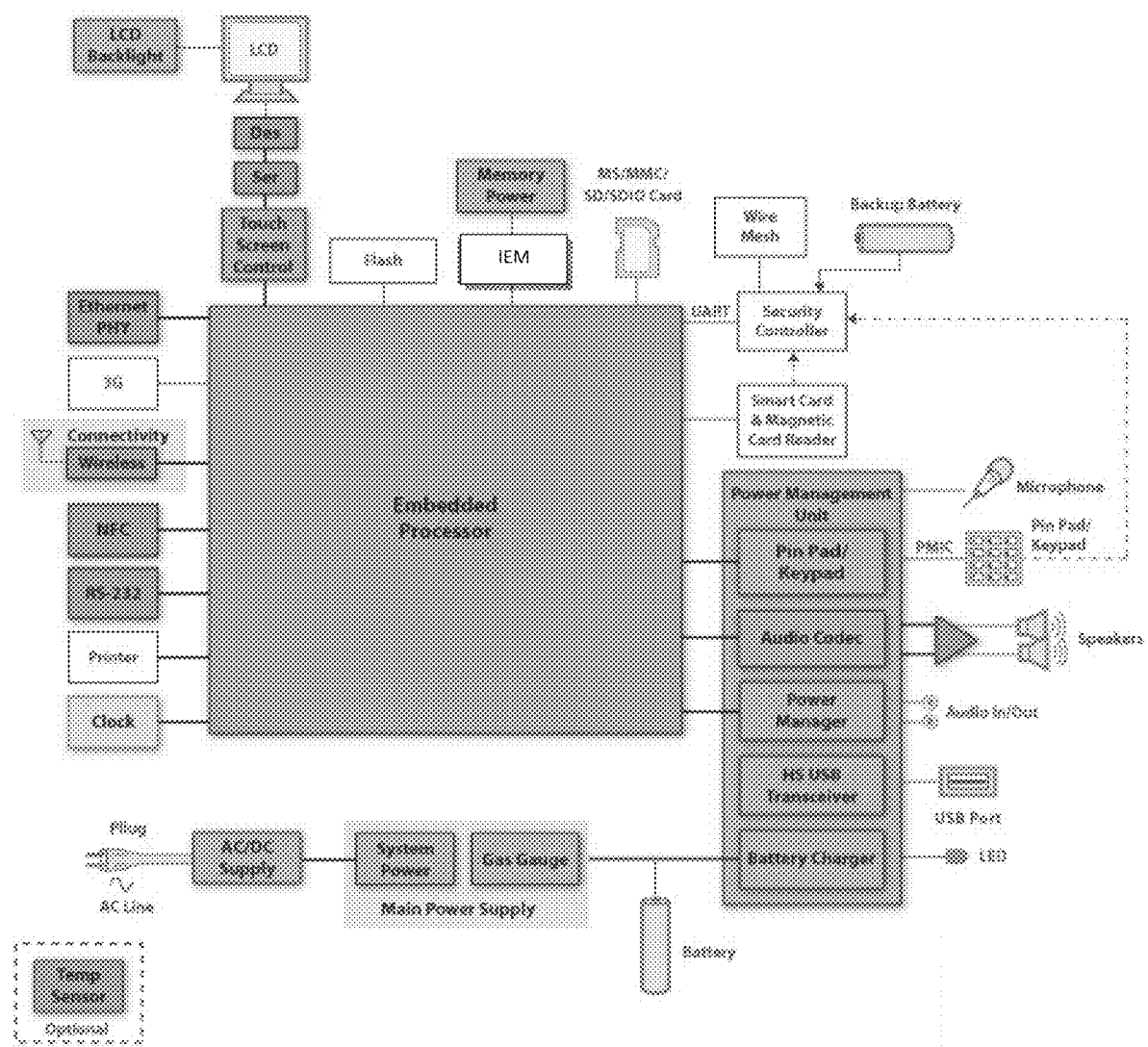
FIG. 6 is a block diagram of a point of sale system including software for implementing the method for processing point of sale transaction documentation in accordance with the present teachings.

At step 4, the receipt is scanned by the customer to extract and view, process, or file the data stored therein. FIG. 6 is a block diagram of a point of sale system including software for implementing the method for processing point of sale transaction documentation in accordance with the present teachings. In this embodiment, the IEM functionality described herein is implemented in software stored in the tangible memory and executed by the system processor. The operation of the software is depicted in FIG. 7 below.

Figure 7A:
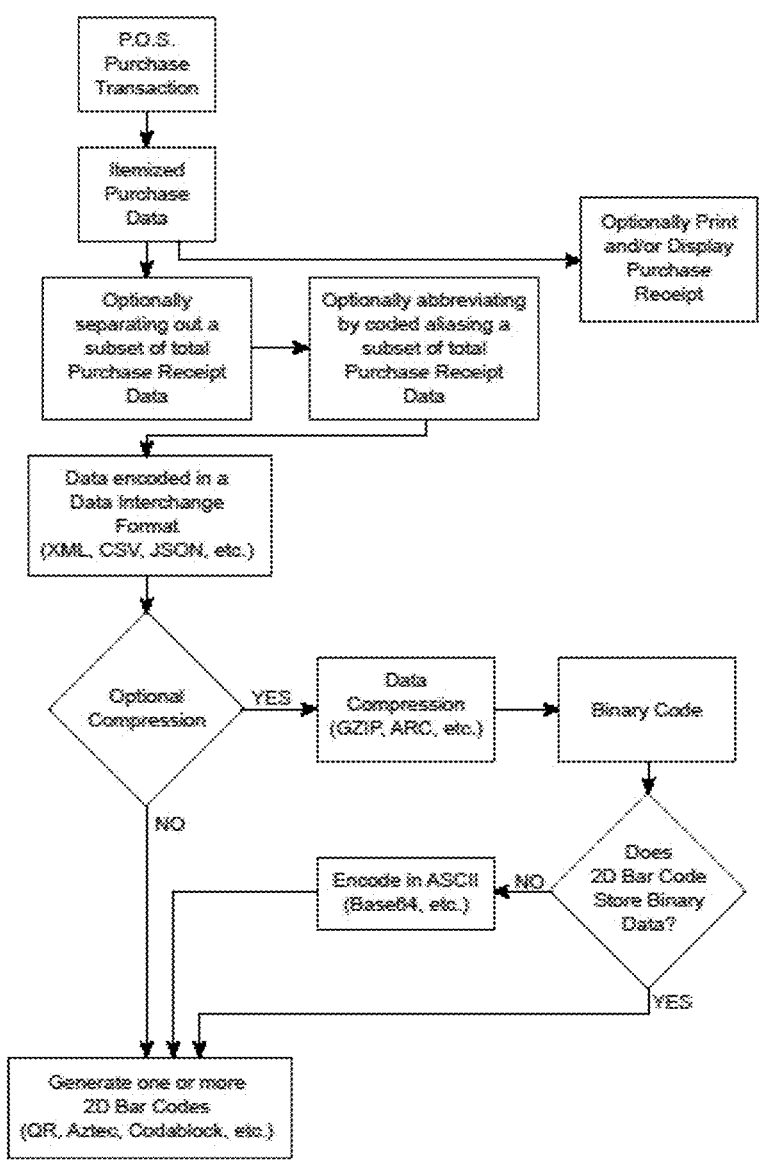
FIG. 7(a) is a first segment of a flow diagram illustrating the operation of the software module depicted in FIG. 6.

FIG. 7(a) is a first segment of a flow diagram illustrating the operation of the software module depicted in FIG. 6.

Figure 7B:
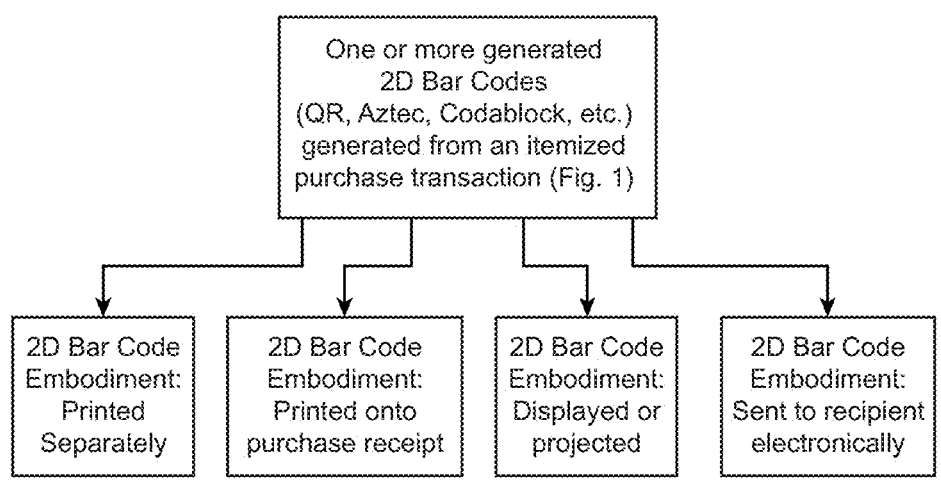
FIG. 7(b) is a second segment of the flow diagram illustrating the operation of the software module depicted in FIG. 6.

FIG. 7(b) is a second segment of the flow diagram illustrating the operation of the software module depicted in FIG. 6.

As illustrated in FIG. 7(a), itemized purchase data is captured from the point-of-sale system and either: a) preprocessed, in accordance with the present teachings, to parse out a subset of total purchase receipt data and then optionally further processed to abbreviate a subset of total purchase receipt data with coded aliasing or b) printed and/or displayed as captured from the point of sale system.

If the data is processed in accordance with the present teachings, then it is subsequently encoded in a data interchange format such as XML, CSV, JSON, or other suitable format. This pre-coded data is then optionally compressed using GZIP, ARC, or other suitable scheme and output as binary, ASCII or other suitable data format for bar code encoding below.

Whether compressed or not, in accordance with the present invention, the encoded data encoded into a machine readable format such as a two-dimensional (2D) or three-dimensional (3D) bar code, or series of codes, e.g.: QR, Aztec, Codablock or other suitable conventional or proprietary machine (e.g. optical) readable coding scheme. (A 3D bar code, or series of codes, could be implemented with an imprint or impression on paper or with holographic photography.) For the balance of this disclosure, it should be understood that when reference is made to a 2D bar code, any of the alternative embodiments mentioned above is included by way of global reference.

As illustrated in FIG. 7(b), the 2D bar code, or series of codes, are then either printed separately, printed at the end of the purchase receipt, display or projected, or sent to an intended recipient via a wired or wireless electronic connection or local, wide area or global network.

Figure 8:
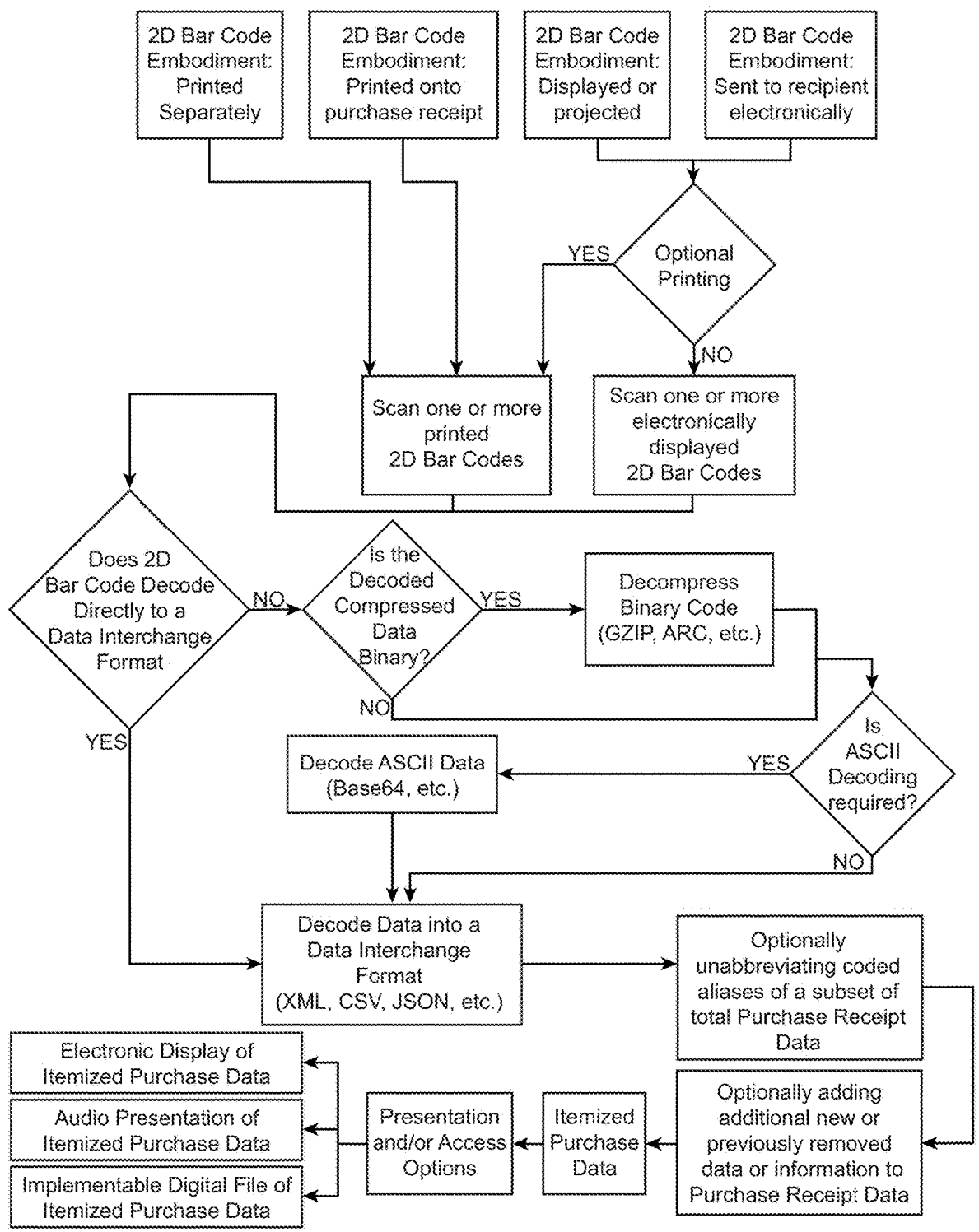
FIG. 8 illustrates how the 2D bar code generated in the process illustrated in FIG. 7 might be utilized by a user in accordance with the present teachings.

FIG. 8 illustrates how the 2D bar code, or series of codes, generated in the processed illustrated in FIG. 7 might be utilized by a user in accordance with the present teachings. As shown in FIG. 8, the 2D bar code, or series of codes, are scanned if it was not already stored or received in electronic form. The data is then extracted from the 2D bar code, or series of codes, using complementary decompression and decoding schemes relative to the encoding and compression schemes employed above, to output itemized purchase data along with any optionally added user or merchant data. This output is then processed, transmitted, read out, displayed and/or stored in accordance with the user's preferences.

A key feature of the present invention is that the data and information that it makes immediately and thereafter available to the smart phone or similar device of purchasing customer or bookkeeper, is that such smart phones or similar devices can read this data and information from itemized receipt audibly for the vision impaired at the merchant's location at the time of purchase.

Those skilled in the art will appreciate that the present invention presents improvements in multiple aspects of implementation and usage over methods requiring the scanning or photographic image capture of an entire and complete printed paper receipt, and the associated necessary steps of image processing and/or construction from multiple images, OCR (Optical Character Recognition) conversion and reconstruction formatting of retrieved alphanumeric data. These improvements include ergonomic and user experience improvements for all users including those that are vision-impaired, improved flexibility in customizing information between merchant and purchaser, improved speed and accuracy of obtaining the data from an itemized receipt, and a significantly improved manner of insuring standardizing formatting of itemized receipt data and other information across multiple merchants and receipts.

The present invention requires only that the customer user scan in one or more two-dimensional codes. Compared to the need to scan an entire paper receipt, a two-dimensional code or series of such codes can be quickly and simply identified and targeted by the customer user, captured by a camera-equipped phone device, via a dedicated app or the same scanning, recognition and converting process made available within multiple apps. When a code or a series of codes are recognized, an app can instantly signal recognition to the customer user and in that same instant, present the whole of the formatted itemized receipt data and optionally additional merchant or third-party partner services, conversions, information, data, media or links to the same.

The present invention addresses problems in the art by pre-formatting itemized receipt data plus optional additional information or data and encoding it into one or more much more easily recognized and captured two-dimensional codes. Implementation of the present invention in the Point of Sale (POS) systems of multiple vendors will insure accuracy of the itemized receipt data and its embodiment in a standardized and readily useful format.

Additionally, such two-dimensional codes as used in the present invention also have the option to encode redundancy and error-checking capabilities that will further insure survivability and accuracy of the itemized receipt data and other optional receipt information.

The real-time results immediately following a purchase afforded by the present invention can provide definite advantages to customers, and in particular to customers that are visually challenged and would benefit from having direct feedback about a multi-item purchase directly following a sale, if unable to visually confirm something about purchased items and when they were still in the vicinity of the merchant who might be able to better resolve any discovered discrepancy.

Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for processing point of sale transaction documentation generated by a POS system comprising:
    a first system on a first platform comprising:
    a first processor operationally coupled between said point of sale system and a device adapted to output said documentation;
    memory fixed in a tangible medium and coupled to said processor;
    a user interface operationally coupled to said processor for inserting user data midstream between point of sale system and the device adapted to output said documentation;
    code stored in said memory for execution by said processor, said code being adapted to capture and process the inserted user data and data from said point of sale system to combine, encode, and compress the inserted user data and the data from the point of sale system and output to said device an optical machine-readable symbol representative of said encoded combined data.

2. The invention of claim 1 wherein said second processor is adapted to output a bar code.

3. The invention of claim 2 wherein said bar code is a two-dimensional bar code.

4. The invention of claim 1 further including code for encoding at least a subset of said data.

5. The invention of claim 1 wherein said new data includes unabbreviated coded aliases of data included in said data at the time of capture.

6. The invention of claim 1 including code for printing said reconstructed itemized receipt data.

7. The invention of claim 1 including code for displaying and editing said reconstructed itemized receipt data.

8. The invention of claim 1 including code for execution by said second processor for audibly outputting said reconstructed itemized receipt data.

9. The invention of claim 5 including code for wirelessly transmitting said symbol associated with each transaction.

10. A system for processing point of sale transaction documentation generated by a point of sale system comprising:
    a first processor on a first platform operationally coupled between said point of sale system and a device adapted to output said documentation;
    a first memory fixed in a first tangible medium and coupled to said processor;
    a user interface for providing data from a user operationally coupled to said first processor and said memory for inserting user data midstream between said point of sale system and said output device;
    first code stored in said memory for execution by said first processor, said first code being adapted to capture and process data from said point of sale system to combine, encode, and compress the inserted user data and the data from the point of sale system and output an optical machine-readable symbol representative of said combined transaction data and said user data;
    a second processor on a second platform, physically independent from said first platform, for reading said optical machine-readable symbol; and
    a second memory fixed in a second tangible medium on said second platform for storing second code for execution by said second processor, said second code being adapted to process said symbol and audibly output said reconstructed itemized receipt data and said user data in response thereto.

* * * * *